US008996253B2

(12) United States Patent
Watanabe et al.

(10) Patent No.: US 8,996,253 B2
(45) Date of Patent: Mar. 31, 2015

(54) MOVABLE CARRIAGE

(71) Applicant: Canon Kabushiki Kaisha, Tokyo (JP)

(72) Inventors: Kazuhiro Watanabe, Tokyo (JP); Naofumi Sekine, Kawasaki (JP); Yasuhiro Morishita, Tokyo (JP); Yoshiki Kuno, Tokyo (JP); Takeshi Nakata, Kawasaki (JP); Wataru Kaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/960,629

(22) Filed: Aug. 6, 2013

(65) Prior Publication Data
US 2014/0046543 A1 Feb. 13, 2014

(51) Int. Cl.
*B62D 6/04* (2006.01)
*B62D 1/02* (2006.01)
*B62B 5/00* (2006.01)
*B62B 3/00* (2006.01)

(52) U.S. Cl.
CPC .. *B62D 6/04* (2013.01); *B62D 1/02* (2013.01); *B62B 5/0073* (2013.01); *B62B 3/001* (2013.01)
USPC .......................................................... 701/41

(58) Field of Classification Search
CPC .................................. B62D 6/04; B62D 1/02
USPC .......................................................... 701/41
See application file for complete search history.

(56) References Cited

U.S. PATENT DOCUMENTS 8,573,338 B2 * 11/2013 Gal et al. ...................... 180/65.1
2003/0127272 A1 * 7/2003 Baker et al. ................... 180/326

FOREIGN PATENT DOCUMENTS

| JP | 692259 A | | 4/1994 | |
|---|---|---|---|---|
| JP | H0692259 A | * | 4/1994 | ............... B62D 6/00 |
| JP | 10203401 A | | 8/1998 | |
| JP | 2001-309910 A | * | 11/2001 | ............... A61B 6/00 |
| JP | 2001309910 A | | 11/2001 | |

* cited by examiner

*Primary Examiner* — Mary Cheung
*Assistant Examiner* — Brian P Sweeney
(74) *Attorney, Agent, or Firm* — Canon USA Inc. IP Division

(57) ABSTRACT

A movable carriage having front wheels and rear wheels includes, a detection unit detecting a direction caused by the operator pushing or pulling a grip unit, a rear-wheel steering angle changing unit changing a steering angle to cause a phase of the rear wheel to be the same as or opposite to the phase of the front wheel according to whether an angle between the detected direction and a center axis of the movable carriage is a predetermined angle or smaller, and a front-wheel steering angle changing unit changing a steering angle to cause a phase of the front wheel to be the same as or opposite to the detected direction according to whether the detected direction is a direction in which the movable carriage is pushed or pulled, when the angle between the detected direction and the center axis of the carriage exceeds the predetermined angle.

7 Claims, 7 Drawing Sheets

MOVABLE CARRIAGE

BACKGROUND OF THE INVENTION

1. Field of the Invention

The present invention relates to a movable carriage, and particularly to a movable carriage that is moved to a hospital room with an X-ray imaging apparatus mounted thereon for taking an X-ray photography.

2. Description of the Related Art

A movable carriage of this type generally has wheels on a front and rear of a carriage body. The wheels include wheels that can freely steer (i.e., can change a moving direction of the carriage) and wheels that cannot steer. Examples of the combination of wheels in a movable carriage include, a movable carriages in which the front wheels can freely turn and the rear wheels cannot freely steer, a movable carriage in which the front wheels cannot freely steer and the rear wheels can freely steer, and a movable carriage in which the front and rear wheels can freely steer.

Japanese Patent Application Laid-Open No. 2001-309910 discusses a carriage that includes front wheels that can freely steer, and rear wheels that cannot be steered, and has an X-ray control unit mounted thereon. This carriage can move forward or backward with a drive motor by an operation of a lever handle.

Japanese Patent Application Laid-Open No. 10-203401 discusses a steering switching carriage having a steering switching mechanism that can switch a "front/rear wheels steerable operation" and an "operation of fixing rear wheels in straight moving direction and freely steering front wheels".

Japanese Patent Application Laid-Open No. 6-92259 discusses a four-wheel steering control apparatus that causes phases of front and rear wheels to be the same as each other in a region where a steering angle is a predetermined value or smaller, and changes the steering angle of the rear wheels to cause the phase of the rear wheels to be opposite to the front wheel in a region where the steering angle is a predetermined steering angle or larger.

Desired traveling performance of a carriage is different depending upon a travelling place or condition. Specifically, on a straight corridor, the carriage is required to travel with excellent straight-line stability according to an operator's pushing and pulling operation of the carriage. When there is an obstacle in the traveling direction, the carriage desirably moves to the right or to the left with the direction of the carriage body being maintained according to an operation of changing its course to the right or to the left by the operator. When steering a corner, the carriage desirably moves with excellent steering performance without a collision between the carriage body and the corner or wall due to inner/outer wheel difference.

However, the movable carriage discussed in Japanese Patent Application Laid-Open No. 2001-309910 cannot keep the direction of the carriage body when an operator tries to change its course during the movement in a straight line, since the carriage is configured in such a manner that the front wheel can freely steer, and the rear wheel cannot steer. When turning the corner, the carriage generates inner/outer wheel difference.

The carriage discussed in Japanese Patent Application Laid-Open No. 10-203401 does not have a grip unit. Therefore, it cannot keep up with the operation of pushing or pulling the carriage by the operator. The carriage is configured in such a manner that the rear wheel has the phase opposite to the phase of the front wheel, or is fixed in the straight moving direction. Therefore, the carriage cannot keep the direction of the carriage body when the operator tries to change its course during the movement in a straight line.

The four-wheel steering control apparatus discussed in Japanese Patent Application Laid-Open No. 6-92259 changes a steering angle to a steering operation of a driver. It cannot keep up with the operation of pushing or pulling the carriage by the operator.

SUMMARY OF THE INVENTION

The present invention is directed to a movable carriage having excellent following performance to an operator according to a place or condition in which the carriage travels.

According to an aspect of the present invention, a movable carriage having a front wheel and a rear wheel, includes a grip unit configured to be held and pushed or pulled by an operator for operating a moving direction of the movable carriage, a detection unit configured to detect a direction in which the operator pushes or pulls the grip unit, a rear-wheel steering angle changing unit configured to change a steering angle so as to cause a phase of the rear wheel to be the same as or opposite to a phase of the front wheel according to whether an angle between the detected direction and a center axis of the movable carriage is a predetermined angle or smaller, and a front-wheel steering angle changing unit configured to change a steering angle so as to cause a phase of the front wheel to be the same as or opposite to the detected direction according to whether the detected direction is a direction in which the movable carriage is pushed or a direction in which the movable carriage is pulled, when the angle between the detected direction and the center axis of the carriage exceeds the predetermined angle.

Further features of the present invention will become apparent from the following detailed description of exemplary embodiments with reference to the attached drawings.

DESCRIPTION OF THE EMBODIMENTS

Exemplary embodiments of a movable carriage according to the present invention are described below with reference to the drawings.

Figure 1A:
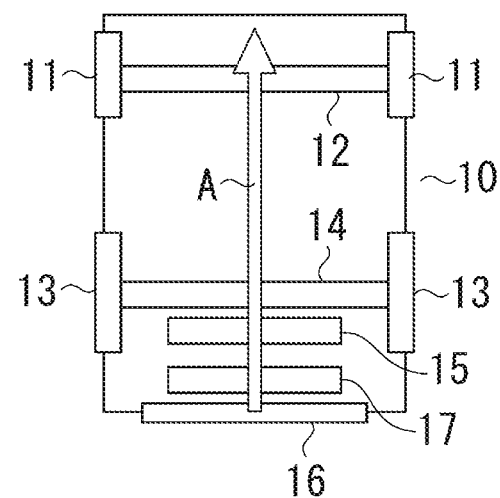
FIG. 1A is a block diagram illustrating a schematic configuration of a movable carriage according to an exemplary embodiment of the present invention.

FIG. 1A is a block diagram illustrating a schematic configuration of a movable carriage according to an exemplary embodiment of the present invention.

In FIG. 1A, a movable carriage 10 includes a pair of left and right front wheels 11, a front-wheel steering angle changing unit 12 (front-wheel steering angle changing means), a pair of left and right rear wheels 13, and a rear-wheel steering angle changing unit 14 (rear-wheel steering angle changing unit). The movable carriage 10 further includes a steering angle changing control unit 15, a grip 16, and a stress detection unit 17 (stress detection means). The stress detection unit 17 detects stress (indicating a direction in which the grip 16 is pushed or pulled) applied by an operator who grips the grip 16 to operate the carriage. The steering angle changing control unit 15 controls the change in the steering angle of the front wheels 11 and the rear wheels 13 through the front-wheel steering angle changing unit 12 and the rear-wheel steering angle changing unit 14 according to an angle between the direction of the stress and a center axis A of the carriage.

Various methods including a method utilizing a piezo resistance effect in which an electric resistance is changed by applied pressure are practicably provided as a method for detecting the externally applied stress by the stress detection unit 17. A plurality of stress sensors according to the methods described above can be combined with different directions to detect the direction or angle of the stress. There is also a method in which the grip 16 and the carriage body of the carriage are movably connected, and an angle of stress is derived by the connection angle.

Figure 1B:
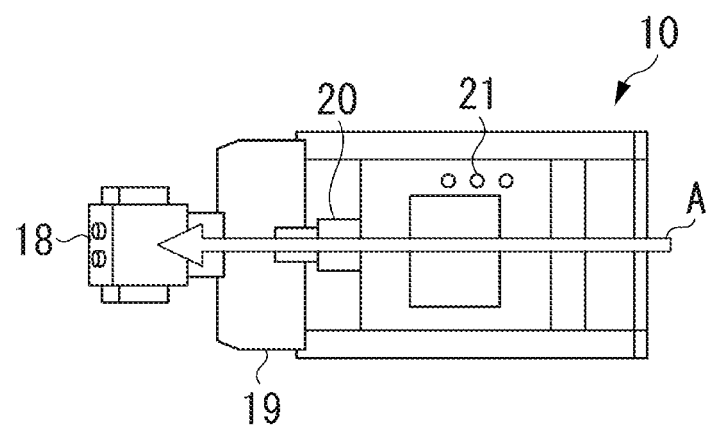
FIG. 1B is a top view when the movable carriage is used for an X-ray imaging apparatus.
Figure 1C:
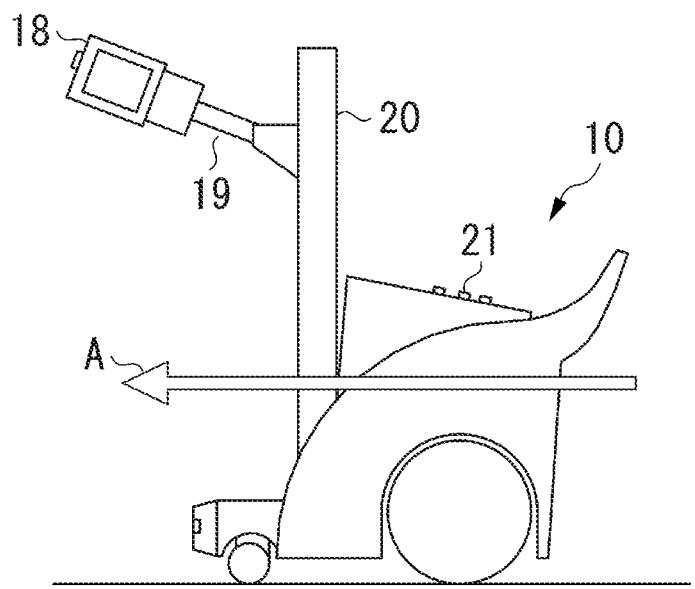
FIG. 1C is a side view when the movable carriage is used for the X-ray imaging apparatus.
Figure 1D:
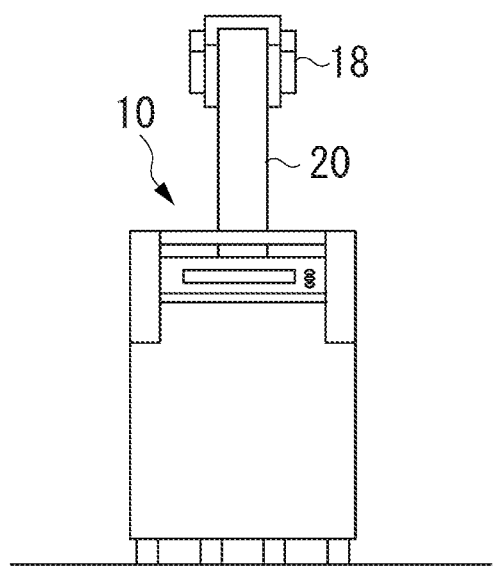
FIG. 1D is a back view when the movable carriage is used for the X-ray imaging apparatus.

FIGS. 1B, 1C, and 1D are external views illustrating a top, a side, and a back of the movable carriage according to the present exemplary embodiment when the carriage is used for a portable X-ray imaging apparatus. When the movable carriage according to the present exemplary embodiment is used for the portable X-ray imaging apparatus, the movable carriage 10 mounts thereon an X-ray source 18, an arm 19, a support rod 20, and an X-ray control unit 21. A driving power unit (not illustrated) may sometimes be mounted in addition to these components.

Figure 2:
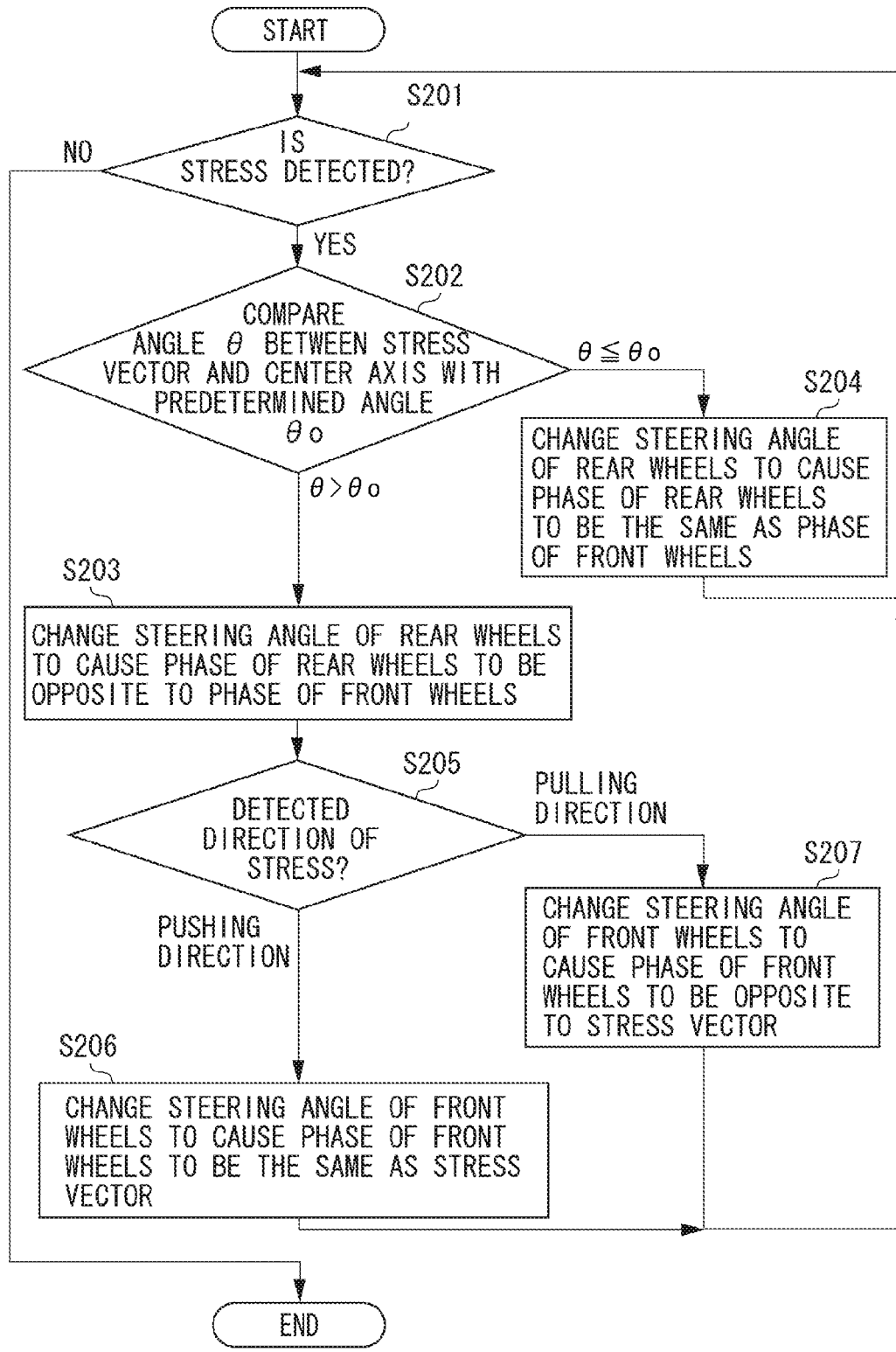
FIG. 2 is a flowchart illustrating a procedure of a determination and process involved with a change in a steering angle of front wheels and rear wheels of the movable carriage according to a first exemplary embodiment.

FIG. 2 is a flowchart illustrating a flow of determination and process involved with a control of changing a steering angle of the front wheels and the rear wheels according to the stress applied by the operator in the movable carriage according to a first exemplary embodiment of the present invention.

In step S201 in FIG. 2, the movable carriage 10 according to the present exemplary embodiment determines whether the stress detection unit 17 detects stress. When the stress detection unit 17 detects stress (Yes in step S201), in step S202, the movable carriage 10 compares an angle θ between a vector of the stress and a center axis A of the carriage with a predetermined angle $\theta_0$. In step S203, the carriage changes the steering angle of the rear wheels by the rear-wheel steering angle changing unit 14 so that the phase of the rear wheels becomes opposite to the phase of the front wheels, when the angle θ exceeds the predetermined angle $\theta_0$ ($\theta > \theta_0$ in step S202). On the other hand, in step S204, the carriage changes the steering angle of the rear wheels by the rear-wheel steering angle changing unit 14 so that the phase of the rear wheels becomes the same as the phase of the front wheels, when the angle θ is the predetermined angle $\theta_0$ or smaller ($\theta \leq \theta_0$ in step S202).

In step S205, the direction of the stress is further determined, when the angle θ between the vector of the stress and the center axis A of the carriage exceeds the predetermined angle $\theta_0$. In step S206, the carriage changes the steering angle of the front wheels by the front-wheel steering angle changing unit 12 so that the phase of the front wheels becomes the same as the vector of the stress, when the direction of the stress is a direction of pushing the movable carriage (pushing direction in step S205). On the other hand, in step S207, the front-wheel steering angle changing unit 12 changes the steering angle of the front wheels so that the phase of the front wheels becomes opposite to the vector of the stress, when the direction of the stress is a direction of pulling the movable carriage (pulling direction in step S205).

Figure 3A:
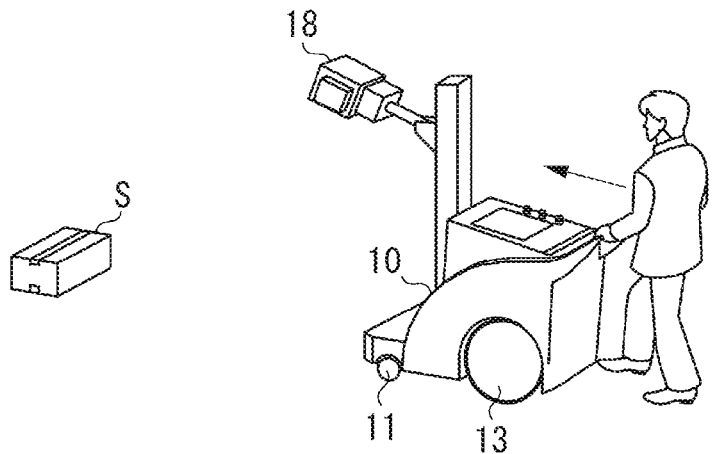
FIGS. 3A, 3B, and 3C are views sequentially illustrating ways of pushing the movable carriage straight by the operator.
Figure 3A:
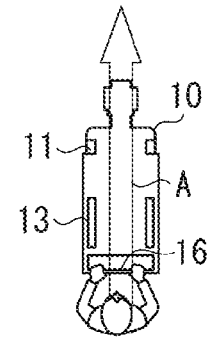
Figure 3B:
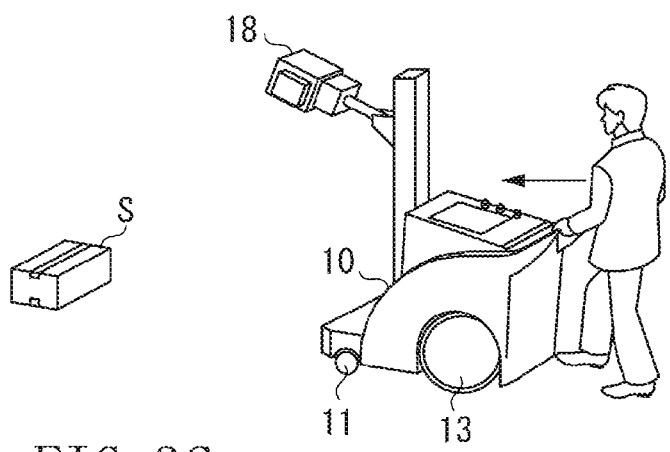
Figure 3B:
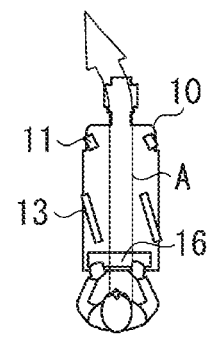
Figure 3C:
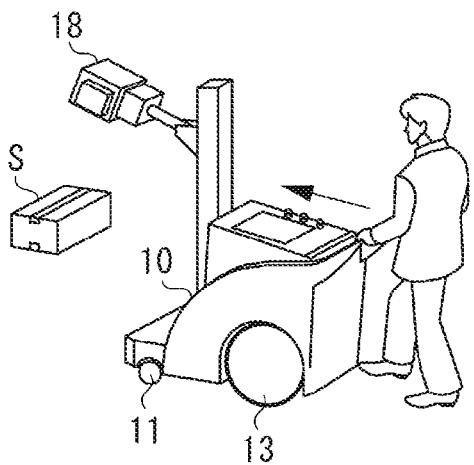
Figure 3C:
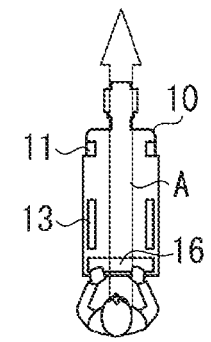

FIGS. 3A, 3B, and 3C are views illustrating ways of pushing the movable carriage 10 according to the present exemplary embodiment straight by the operator, as compared to the state of the wheels.

In FIG. 3A, the movable carriage 10 moves straight on a corridor of a hospital. FIG. 3A includes a perspective view and a plan view of the movable carriage 10 together with the operator. This illustrating manner applies to FIGS. 4 to 6 below.

In FIG. 3B, when the operator applies stress to slightly the left with the grip 16 to avoid an obstacle S on the course, the steering angles of the front wheels 11 and the rear wheels 13 change to the left. As a result, the movable carriage 10 moves to the left with respect to the advancing direction without changing the direction of the carriage body to the operator.

In FIG. 3C, when the movable carriage 10 moves enough for avoiding the obstacle S, the vector of the stress by the operator is returned parallel to the center axis A of the carriage body. Therefore, the front wheels 11 and the rear wheels 13 both face to the direction of the center axis A of the carriage body, and with this state, the carriage moves straight.

When the length L of the carriage body is 1.2 m and the width W of the carriage is 0.8 m, if the movable carriage 10 moves in a horizontal direction by the width W of the carriage during while the carriage advances by a distance corresponding to two carriage bodies (2L), the steering angle α with respect to the advancing direction is obtained from an equation (1).

$$\alpha = \arctan(W/2L) \tag{1}$$

In this case, α is about 18.4 degrees.

Therefore, if the steering angle is controlled to be changed so that the front wheels 11 and the rear wheels 13 have the same phase within about 0 to 20 degrees of the angle of the vector of the stress to the center axis A of the carriage, traveling performance suitable for the movement when the carriage moves straight can be realized.

Figure 4A:
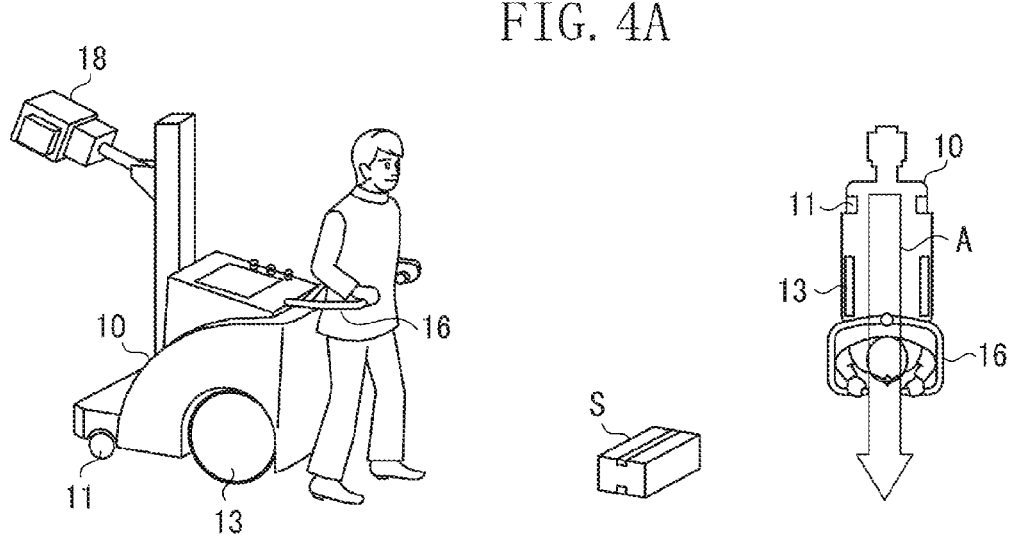
FIGS. 4A, 4B, and 4C are views sequentially illustrating ways of pulling the movable carriage straight by the operator.
Figure 4B:
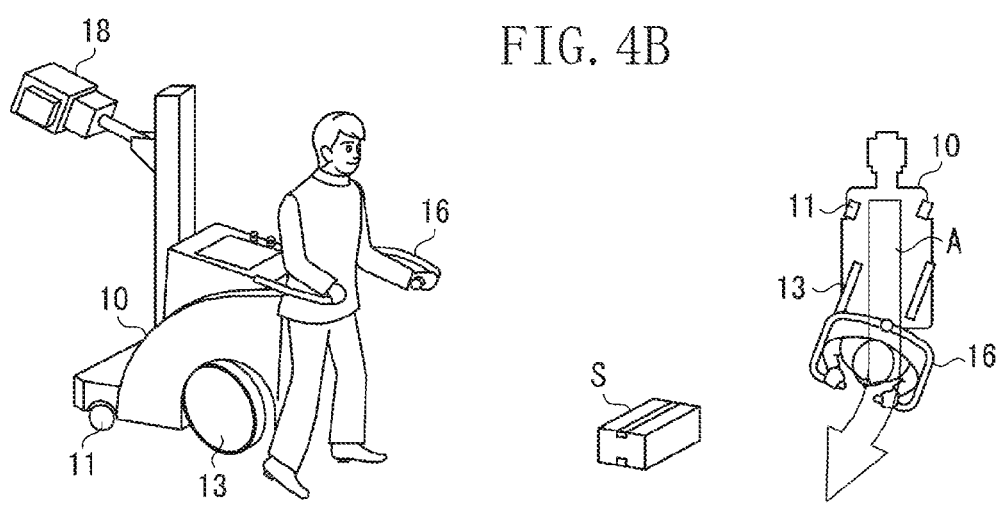
Figure 4C:
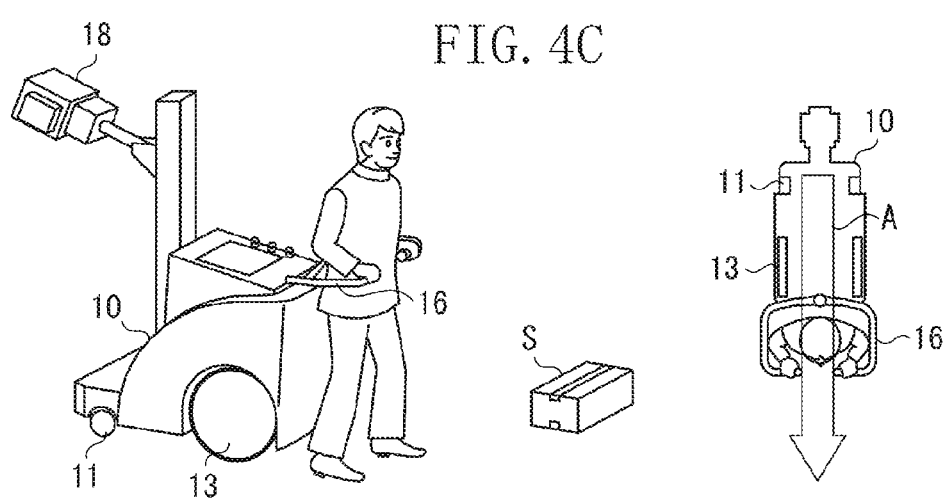

FIGS. 4A, 4B, and 4C are views illustrating ways of pulling the movable carriage 10 according to the present exemplary embodiment straight by the operator, as compared to the state of the wheels. The movable carriage 10 illustrated in FIGS. 4A to 4C is different from the movable carriage 10 illustrated in FIGS. 3A to 3C in that the operator pulls the movable carriage 10, and that the grip 16 and the carriage body of the carriage are movably connected and the steering angle of the wheels is changed by the movable angle. The traveling direction of the movable carriage 10 is opposite to the direction in FIGS. 3A to 3C. On the other hand, the control for the change in the steering angle of the front wheels 11 and the rear wheels 13 to the vector of the stress is the same as that illustrated in FIGS. 3A to 3C. Therefore, the redundant description of this control will be avoided.

As illustrated in FIGS. 3A to 3C and 4A to 4C, when the operator applies stress of the predetermined angle or smaller to the center axis A of the movable carriage 10, the equivalent control is executed when the operator pushes the movable carriage 10 (FIGS. 3A to 3C) and pulls the movable carriage (FIGS. 4A to 4C). Specifically, the steering angles of the front wheels 11 and the rear wheels 13 are changed so that the phases of the front wheels 11 and the rear wheels 13 become the same, and therefore the movable carriage changes the course with the direction of the carriage body being maintained.

Figure 5A:
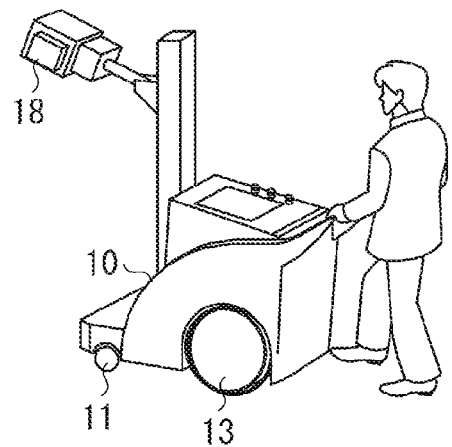
FIGS. 5A, 5B, and 5C are views sequentially illustrating ways of pushing the movable carriage to turn by the operator.
Figure 5A:
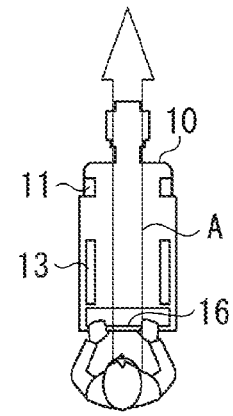
Figure 5B:
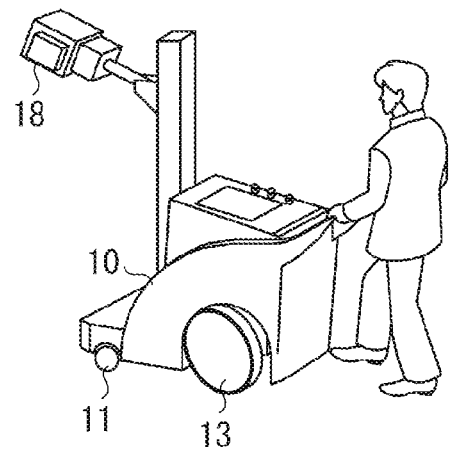
Figure 5B:
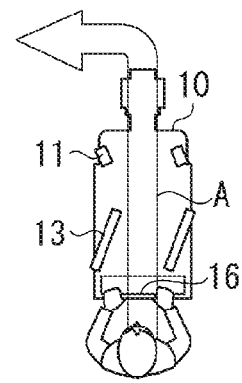
Figure 5C:
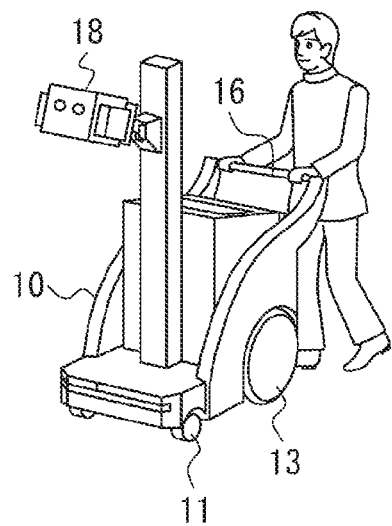
Figure 5C:
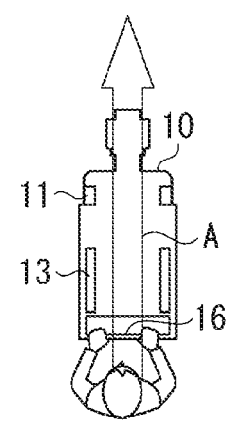

FIGS. 5A, 5B, and 5C are views illustrating ways of pushing the movable carriage 10 according to the present exemplary embodiment to turn a corner by the operator.

In FIG. 5A, the movable carriage 10 moves straight at the beginning. The operator applies stress to the left with respect to the center axis A of the carriage with the grip 16 to turn the movable carriage 10 to the left.

In FIG. 5B, the carriage changes the steering angles so that the front wheels 11 point to the left that is the same as the vector of the stress, and the rear wheels 13 point to the right that is opposite to the front wheels 11. As a result, the movable carriage 10 turns to the left.

In FIG. 5C, when the movable carriage 10 fully turns, the vector of the stress by the operator becomes parallel to the center axis A of the carriage body. Therefore, the front wheels 11 and the rear wheels 13 both point to the direction of the center axis A of the carriage body, and with this state, the movable carriage 10 moves straight.

Figure 6A:
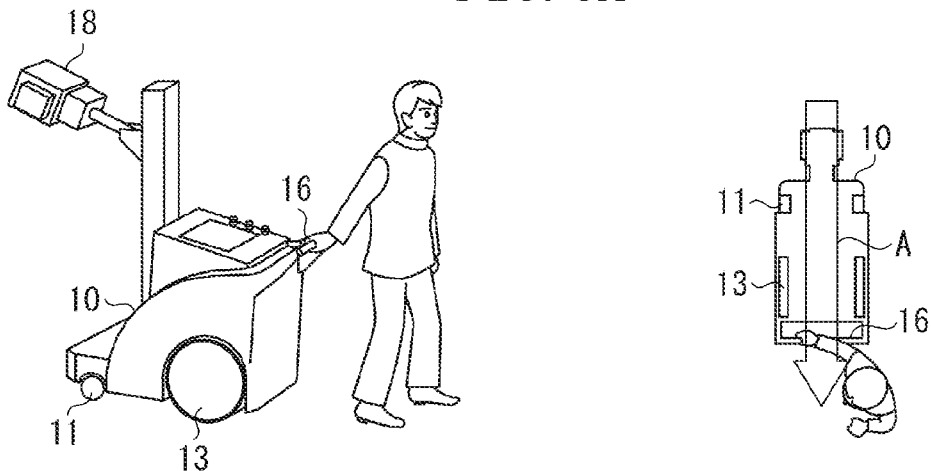
FIGS. 6A, 6B, and 6C are views sequentially illustrating ways of pulling the movable carriage to turn by the operator.
Figure 6B:
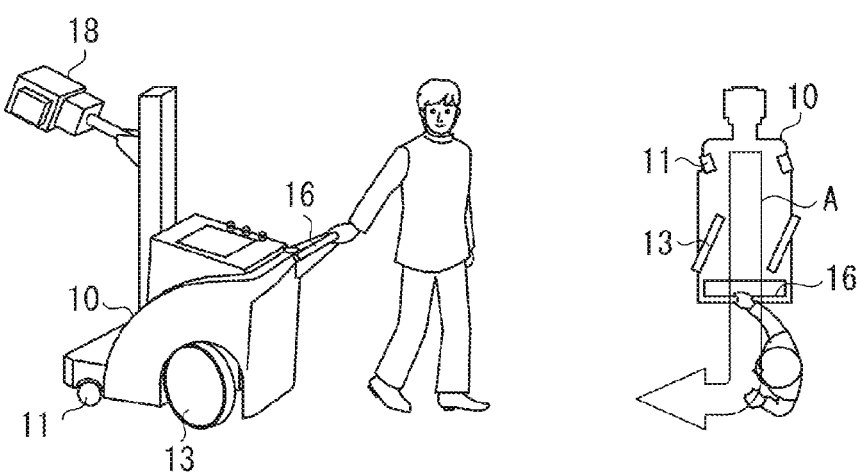
Figure 6C:
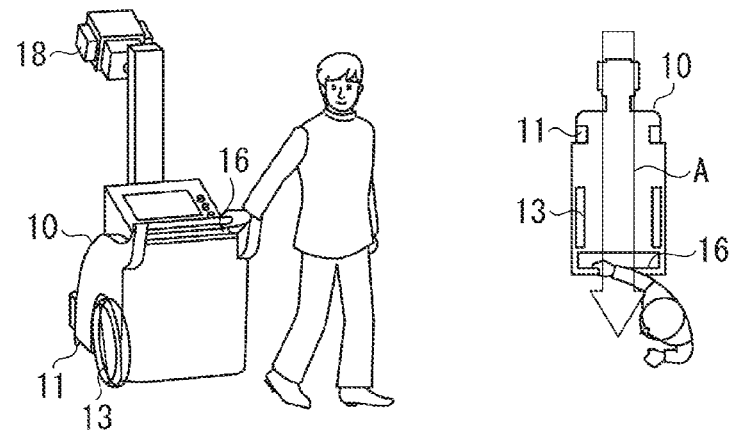

FIGS. 6A, 6B, and 6C are views illustrating ways of pulling the movable carriage 10 according to the present exemplary embodiment to turn a corner by the operator.

As illustrated in FIG. 6A, the operator applies stress to the right to the center axis A of the movable carriage 10, which is moving straight, with the grip 16 to make the movable carriage 10 turn to the right. With this operation, the steering angle of the front wheels 11 changes to the left opposite to the vector of the stress, while the steering angle of the rear wheels 13 changes to the right opposite to the direction of the front wheels 11, as illustrated in FIG. 6B. Then, as illustrated in FIG. 6C, the front wheels 11 and the rear wheels 13 both point to the direction of the center axis A of the carriage body, and with this state, the movable carriage 10 moves straight.

As illustrated in FIGS. 5A to 5C and 6A to 6C, when the operator applies stress exceeding the predetermined angle to the center axis A of the movable carriage 10, the steering angles of the front wheels 11 and the rear wheels 13 change to the opposite phase, when the operator pushes the movable carriage 10 (FIGS. 5A to 5C) and pulls the movable carriage (FIGS. 6A to 6C). In this case, when the operator pushes the movable carriage 10, the phase of the front wheels 11 becomes the same as the vector of the stress applied by the operator, and when the operator pulls the movable carriage 10, the phase of the rear wheels 13 becomes the same as the vector of the stress. Therefore, the front wheels or the rear wheels turn to the direction of the vector of the stress in each case.

As described above, the movable carriage 10 according to the first exemplary embodiment changes its course with the direction of the carriage body being maintained when the operator applies stress of the predetermined angle or smaller to the center axis A of the movable carriage 10, and when the operator applies stress of the predetermined angle or larger, the movable carriage 10 turns. As a result, the movable carriage having excellent following performance to an operator can be realized.

A movable carriage 10 according to a second exemplary embodiment of the present invention further includes a grip detection unit (grip detection means, not illustrated). When the grip detection unit does not detect that the grip is held by an operator, the movable carriage 10 does not change steering angles of front wheels 11 and rear wheels 13, even if the stress detection unit 17 detects stress.

The grip detection unit is configured by mounting a capacitance sensor, a piezoelectric sensor, or resistive sensor on the grip 16. The grip detection unit utilizes the phenomenon in which capacitance, pressure or electric resistance detected by the grip detection unit is different between when the operator holds the grip 16 and when the operator does not hold the grip 16. Various sensors including the one described in Japanese Patent Application Laid-Open No. 2008-99809 are practicably provided as this type of sensor.

The movable carriage 10 according to the present exemplary embodiment includes the grip 16, and the operator makes an operation of moving the carriage 10 by holding the grip 16. Therefore, when the operator does not hold the grip 16, it is considered that the operation of moving the carriage 10 by the operator is not performed. The case where the stress detection unit 17 detects stress in this case includes, for example, following cases.

(1) the case where the movable carriage moves regardless of the direction of the carriage body, such as the case where the operator pulls the carriage to the side.

(2) the case where the position of the X-ray imaging apparatus mounted on the movable carriage 10 or the arm supporting the apparatus moves, and stress caused by this movement is transmitted to the stress detection unit 17.

In the case (1), it is necessary that the front wheels 11 and the rear wheels 13 freely rotate and steer. In the case (2), it is necessary that the front wheels 11 and the rear wheels 13 are stopped for inhibiting the rotation and steering. In either case, the operation of changing the steering angles of the front wheels 11 and the rear wheels 13 based upon the stress detected by the stress detection unit 17 is unnecessary.

A movable carriage 10 according to a third exemplary embodiment of the present invention further includes an operation detection unit (operation detection means, not illustrated) that detects an operator's operation to an object mounted on the carriage. When the operation detection unit detects the operator's operation, the front wheels 11 and the rear wheels 13 are stopped for inhibiting the rotation and steering.

The operation detection unit can be realized by a structure in which a capacitance sensor mounted on the object on the carriage detects that the operator contacts or holds the object, or by a structure in which a sensor detecting a movement of a movable portion (e.g., a support rod rotation portion or arm extension/contraction portion) is mounted on the movable portion of the object on the carriage.

As described above, when the operator operates the object on the carriage, it is necessary that the front wheels 11 and the rear wheels 13 are stopped for inhibiting the rotation and steering. The present exemplary embodiment realizes this operation.

As described above, according to the exemplary embodiments of the present invention, a movable carriage having performance suitable for each of the "condition that the carriage travels (moves straight or turns), the "condition in which the carriage does not travel, but moves", and the "condition in which the object mounted on the carriage is operated", can be realized. Accordingly, a movable carriage having excellent operability can be provided.

These performances are typical for a movable carriage (visiting car) having mounted thereon an X-ray imaging apparatus. However, the present invention is not limited thereto, and is applicable for general movable carriage used for a work in high places, agriculture, civil engineering work, construction, various types of photographing, various examinations, work of construction, work of installation, conveyance, and other cases.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176184 filed Aug. 8, 2012, which is hereby incorporated by reference herein in its entirety.

What is claimed is:

1. A movable carriage having a front wheel and a rear wheel, comprising:
    a grip unit configured to be held and pushed or pulled by an operator for operating a moving direction of the movable carriage;
    a detection unit configured to detect a direction in which the operator pushes or pulls the grip unit;
    a rear-wheel steering angle changing unit configured to change a steering angle so as to cause a phase of the rear wheel to be the same as or opposite to a phase of the front wheel according to whether an angle between the detected direction and a center axis of the movable carriage is a predetermined angle or smaller; and
    a front-wheel steering angle changing unit configured to change a steering angle so as to cause a phase of the front wheel to be the same as the detected direction when the movable carriage is pushed, and to cause the phase of the front wheel to be opposite to the detected direction when the movable carriage is pulled.

2. The movable carriage according to claim 1, further comprising:
    a grip detection unit configured to detect that the operator holds the grip unit,
    wherein the steering angles of the front wheel and the rear wheel based on the direction detected by the detection unit is not changed, when the grip detection unit does not detect that the operator holds the grip unit.

3. The movable carriage according to claim 2, wherein the front wheel and the rear wheel freely rotate and steer, when the grip detection unit does not detect that the operator holds the grip unit.

4. The movable carriage according to claim 2, further comprising:
    an operation detection unit configured to detect an operator's operation on an object mounted on the movable carriage,
    wherein the front wheel and the rear wheel are stopped for inhibiting rotation and steering thereof, when the operation detection unit detects the operator's operation.

5. The movable carriage according to claim 1, wherein an X-ray imaging apparatus is mounted on the movable carriage.

6. The movable carriage according to claim 1, wherein the rear-wheel steering angle changing unit changes the steering angle so as to cause the phase of the rear wheel to be opposite to the phase of the front wheel when the angle between the detected direction and the center axis of the movable carriage exceeds the predetermined angle.

7. The movable carriage according to claim 1, wherein the rear-wheel steering angle changing unit changes the steering angle so as to cause the phase of the rear wheel to be the same as the phase of the front wheel when the angle between the detected direction and the center axis of the movable carriage is the predetermined angle or smaller than the predetermined angle.

* * * * *